(12) United States Patent
Schmalbruch et al.

(10) Patent No.: US 11,554,761 B2
(45) Date of Patent: Jan. 17, 2023

(54) METHOD FOR CONTROLLING AN ELECTROMECHANICAL BRAKING SYSTEM AND ELECTROMECHANICAL BRAKING SYSTEM

(71) Applicant: VOLKSWAGEN AKTIENGESELLSCHAFT, Wolfsburg (DE)

(72) Inventors: Michael Schmalbruch, Wolfenbüttel (DE); Adrian Szawlowski, Berlin (DE)

(73) Assignee: Volkswagen Aktiengesellschaft

( * ) Notice: Subject to any disclaimer, the term of this patent is extended or adjusted under 35 U.S.C. 154(b) by 341 days.

(21) Appl. No.: 16/864,945

(22) Filed: May 1, 2020

(65) Prior Publication Data
US 2020/0353905 A1    Nov. 12, 2020

(30) Foreign Application Priority Data
May 8, 2019   (DE) ..................... 10 2019 206 612.7

(51) Int. Cl.
| | |
|---|---|
| B60T 8/17 | (2006.01) |
| B60T 7/04 | (2006.01) |
| B60T 8/171 | (2006.01) |
| B60T 8/172 | (2006.01) |
| B60T 13/14 | (2006.01) |
| B60T 13/66 | (2006.01) |
| B60T 8/40 | (2006.01) |

(52) U.S. Cl.
CPC ............... *B60T 8/17* (2013.01); *B60T 7/042* (2013.01); *B60T 8/171* (2013.01); *B60T 8/172* (2013.01); *B60T 8/4081* (2013.01); *B60T 13/145* (2013.01); *B60T 13/662* (2013.01); *B60T 2270/10* (2013.01); *B60T 2270/82* (2013.01)

(58) Field of Classification Search
CPC combination set(s) only.
See application file for complete search history.

(56) References Cited

U.S. PATENT DOCUMENTS

| | | |
|---|---|---|
| 8,342,615 B2 | 1/2013 | Drumm |
| 8,457,857 B2 | 6/2013 | Suda |
| 8,899,696 B2 | 12/2014 | Weiberle et al. |

(Continued)

FOREIGN PATENT DOCUMENTS

| | | |
|---|---|---|
| CN | 102762420 A | 10/2012 |
| CN | 106132791 A | 11/2016 |

(Continued)

OTHER PUBLICATIONS

Office Action for Chinese Patent Application No. 202010342640.6; dated Feb. 7, 2022.

*Primary Examiner* — Fadey S. Jabr
*Assistant Examiner* — Naeem Taslim Alam
(74) *Attorney, Agent, or Firm* — Barnes & Thornburg, LLP

(57) ABSTRACT

A method for operating an electromechanical braking system for a transportation vehicle having a brake pedal, a brake master cylinder, and an electromechanical brake booster. The electromechanical brake booster includes an actuator motor for increasing or decreasing the pedal force on the brake master cylinder to boost or reduce the braking power accordingly. A change in the boosting force of the electromechanical brake booster is limited to avoid uncontrolled changes of the brake boosting.

23 Claims, 2 Drawing Sheets

(56) References Cited

U.S. PATENT DOCUMENTS

| | | | |
|---|---|---|---|
| 9,840,244 | B2 | 12/2017 | Dobberphul et al. |
| 10,029,662 | B2 | 7/2018 | Ninoyu et al. |
| 10,040,434 | B2 | 8/2018 | Gerdes et al. |
| 10,077,037 | B2 | 9/2018 | Foitzik et al. |
| 10,272,893 | B2 | 4/2019 | Bunk |
| 2001/0003402 | A1* | 6/2001 | Isono ............... B60T 13/72 303/155 |
| 2001/0020800 | A1* | 9/2001 | Isono ............... B60T 13/165 303/113.5 |
| 2001/0035166 | A1* | 11/2001 | Kerns ............... F02D 41/222 701/114 |
| 2007/0164605 | A1* | 7/2007 | Gronau ............... B60T 13/52 303/114.3 |
| 2010/0025869 | A1 | 2/2010 | Suzuishi et al. |
| 2013/0025273 | A1* | 1/2013 | Nozawa ............... B60T 13/662 60/545 |
| 2014/0214297 | A1* | 7/2014 | Foitzik ............... B60T 8/171 701/70 |
| 2014/0368027 | A1* | 12/2014 | Bohm ............... B60T 11/16 303/14 |
| 2015/0283987 | A1* | 10/2015 | Bareiss ............... B60T 8/171 701/70 |
| 2018/0134261 | A1* | 5/2018 | Akita ............... B60L 7/26 |
| 2018/0251113 | A1* | 9/2018 | Yoshida ............... B60T 8/444 |
| 2019/0193699 | A1* | 6/2019 | Gerdes ............... B60T 8/176 |
| 2019/0217830 | A1* | 7/2019 | Masuda ............... B60T 13/746 |
| 2019/0315322 | A1* | 10/2019 | Goto ............... B60T 8/171 |
| 2020/0384972 | A1* | 12/2020 | Calvo Martinez .... B60T 13/743 |
| 2021/0039620 | A1* | 2/2021 | Mitsugi ............... F16H 55/17 |
| 2021/0078558 | A1* | 3/2021 | Zipprich ............... B60T 13/745 |
| 2021/0129821 | A1* | 5/2021 | Binder ............... B60T 13/745 |
| 2021/0146903 | A1* | 5/2021 | Maier ............... B60T 8/17 |
| 2021/0402968 | A1* | 12/2021 | Haag ............... B60T 7/06 |

FOREIGN PATENT DOCUMENTS

| | | |
|---|---|---|
| CN | 106364473 A | 2/2017 |
| CN | 106458194 A | 2/2017 |
| CN | 106536312 A | 3/2017 |
| DE | 19750977 A1 | 6/1999 |
| DE | 102006040424 A1 | 3/2008 |
| DE | 112009001159 T5 | 7/2011 |
| DE | 102011076423 A1 | 12/2011 |
| DE | 102014211551 A1 | 12/2015 |
| DE | 102014213913 A1 | 1/2016 |
| DE | 112015001384 T5 | 12/2016 |
| DE | 102016210369 A1 | 1/2017 |
| DE | 102016208439 A1 | 11/2017 |
| DE | 102017205209 A1 | 10/2018 |
| KR | 20110138532 A | 12/2011 |
| WO | 2008102468 A1 | 8/2008 |

* cited by examiner

METHOD FOR CONTROLLING AN ELECTROMECHANICAL BRAKING SYSTEM AND ELECTROMECHANICAL BRAKING SYSTEM

PRIORITY CLAIM

This patent application claims priority to German Patent Application No. 10 2019 206 612.7, filed 8 May 2019, the disclosure of which is incorporated herein by reference in its entirety.

SUMMARY

Illustrative embodiments relate to a method for operating an electromechanical braking system for a transportation vehicle and an electromechanical braking system having such a brake booster.

BRIEF DESCRIPTION OF THE DRAWINGS

Exemplary embodiments are explained hereafter with reference to the associated drawings, in which.

DETAILED DESCRIPTION

Figure 1:
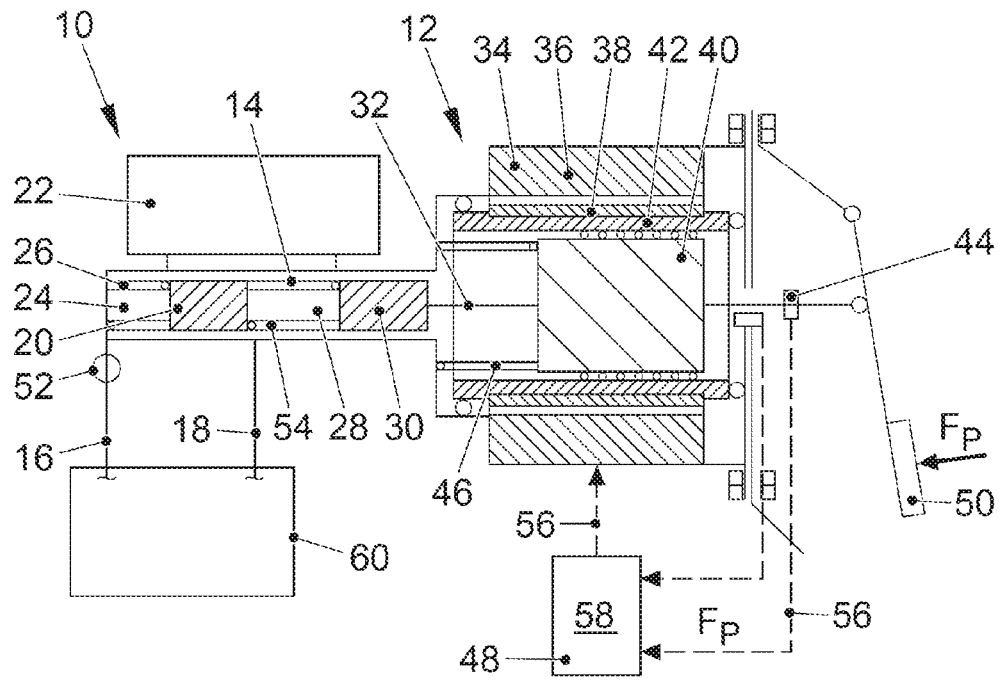
FIG. 1 shows an electromechanical braking system having a brake pedal, an electromechanical brake booster, and a brake master cylinder for carrying out a disclosed method for controlling the braking system.

Electromechanical braking systems, which are becoming more and more widespread, are known in automotive engineering. Such braking systems often comprise a pedal decoupling unit, which is connected upstream from a brake master cylinder, whereby a brake pedal actuation by the driver in the operating mode "brake-by-wire" does not result in direct actuation of the brake master cylinder by the driver. The brake master cylinder is instead actuated in the operating mode "brake-by-wire" by an electrically controllable pressure provision unit, i.e., "externally" actuated. To provide a pleasant pedal feeling to the driver in the operating mode "brake-by-wire," the braking systems typically comprise a brake pedal feeling simulation unit. In these braking systems, the brake can also be actuated due to electronic signals without active assistance of the transportation vehicle driver. These electronic signals can be output, for example, by an electronic stability program or an adaptive cruise control system.

An electromechanical brake booster having a pushrod, which connects a brake pedal of a transportation vehicle to a brake master cylinder, is known from DE 10 2016 210 369 A1. The electromagnetic brake booster furthermore comprises a gearing motor, which is coupled to the pushrod, and a control unit for activating the gearing motor. The control unit receives the pedal force and the movement of the pushrod as input variables. In this case, the control unit is configured in such a way that a target reset variable for the pushrod is determined from the pushrod movement. An activation signal for the gearing motor is generated in this case from the target reset speed, an actual reset speed, and the pedal force.

DE 10 2017 205 209 A1 discloses a method for compensating for a too small actuator dynamic range in an electromechanical braking system. In this case, a mechanical actual braking moment is predicted by a model of the brake actuator and a compensation moment is generated as a function of the predicted mechanical actual braking moment by activating a further transportation vehicle component, by which a regulating deviation, which results upon the regulation of the mechanical actual braking moment to the target braking moment, is compensated for.

A method for regulating an electrohydraulic braking system for a transportation vehicle, which may be activatable in a "brake-by-wire" operating mode, is known from DE 10 2011 076 423 A1. The braking system comprises an electronic control and regulating unit, via which a pressure provision unit having a piston-cylinder assembly is activatable, wherein the piston is actuatable by an electromechanical actuator. To protect the pressure provision unit from damage, it is provided that a pressure target value at a standstill of the transportation vehicle or a transition of the transportation vehicle into a standstill is limited to a predetermined pressure maximum value.

In electromechanical brake boosters, there is the option of influencing the boosting of the pedal force during braking by software application and based on various measured values, such as velocity and pressure. The risk results therefrom that in the event of large jumps in the applied characteristic curve, the target variable for the amplification and thus the amplification of the pedal force perceptible to the driver will change suddenly and strongly. The driver cannot react sufficiently rapidly thereto, which can result in hazardous underbraking or overbraking.

The disclosed embodiments limit the change of the brake boosting by an electromechanical brake booster in an electromechanical braking system to avoid uncontrollable driving situations for the driver.

This is achieved by a method for controlling an electromechanical braking system having a brake pedal, a brake master cylinder operationally connected to the brake pedal, and having an electromechanical brake booster. In this case, the electromechanical brake booster comprises an actuator motor, which increases a pedal force on the brake pedal. The method comprises the following operations: ascertaining a target variable for the brake boosting and an actual variable for the brake boosting, wherein a gradient of the change of the target variable of the brake boosting is determined and is compared to a threshold value for the gradient of the change of the brake boosting, wherein if the threshold value for the gradient is exceeded, a change of the boosting force by the electromechanical brake booster is limited. The effect of the above-described jumps in the assistance force for the driver is to be controllable with the aid of the gradient limitation. In this case, the boosting of the brake boosting perceptible to the driver only changes in a controllable framework, any change going beyond this is limited by the proposed method, so that uncontrolled driving states are avoided. The driver can gradually adapt his driving behavior due to the gradient limitation of the brake boosting, so that safety-critical driving situations do not result. At the end of the gradient limitation, a base boosting is reached, which it is no longer possible to fall below.

Improvements and nontrivial refinements of the method specified in the independent claim for controlling an electromechanical braking system are possible by way of the features set forth in the dependent claims.

In at least one disclosed embodiment, it is provided that in addition an absolute change of the target variable for the brake boosting is ascertained, wherein the absolute change is compared to a further threshold value and in the event of an absolute change which is less than the further threshold value, no intervention is performed by the electromechanical brake booster in the change of the boosting force. If the offset is less than a jump in the brake boosting considered to be a permissible offset by the system, there is thus no intervention and the change of the brake boosting is implemented as planned. In this way, a correspondingly rapid change of the boosting force is enabled to increase or reduce the braking force sufficiently rapidly, in particular, to avoid locking wheels.

It is optional in this case if a limitation of the change of the boosting force takes place in the event of an absolute change of the target variable for the brake boosting which is greater than the further threshold value. If the characteristic curve provides a larger jump in the change of the brake boosting, this jump is thus limited by the gradient limitation and the change is chronologically slowed, so that the driver can adapt his behavior to the change and uncontrollable driving situations do not occur.

In at least one disclosed embodiment of the method, it is provided that in the event of a repeated change of the target variable for the brake boosting, a smoothing filter is used. In the event of a planned repeated change of the boosting force, corresponding deflections can be avoided by a smoothing filter, whereby the change of the boosting force becomes more easily controllable for the driver, which increases the driving comfort.

It is beneficial in this case if the smoothing filter comprises a first filter constant for increasing the brake boosting and a second filter constant for reducing the brake boosting. If a jump in the direction of higher brake boosting and a following jump in the direction of lower brake boosting follow in rapid chronological sequence in the characteristic curve, both jumps can thus be smoothed correspondingly by the filters so that the adaptation of the brake boosting takes place more harmonically and so it is easier to control for the driver.

In at least one disclosed embodiment of the method, it is provided that a reduction of the boosting force of the electromechanical brake booster is limited. To avoid a strong reduction in the boosting force and so as not to give the driver the feeling that the electromechanical brake booster has suddenly failed, a reduction of the boosting force is limited. The driver can thus adapt the pedal force to the boosting force in a manner easy and safe to control, so that critical driving states do not occur.

Alternatively or additionally, it is provided that an increase of the boosting force of the electromechanical brake booster is limited. To avoid overbraking, it is provided that an increase of the boosting force is also limited to prevent the transportation vehicle from unexpectedly strongly decelerating without a command of the driver. This driving state is critical in the case of roadways having low coefficient of friction, since an uncontrolled increase of the boosting force can result in locking of the wheels. In the case of roadways having a high coefficient of friction between the tires and the roadway, this results in a correspondingly strong deceleration, which can result in hazardous driving situations for the following traffic.

An electromechanical braking system having a brake pedal, a brake master cylinder operationally connected to the brake pedal, and having an electromechanical brake booster is proposed. It is provided in this case that the electromechanical brake booster comprises an actuator motor, which increases a pedal force on the brake pedal. The electromechanical braking system furthermore comprises a control unit, on which a machine-readable program code is stored, wherein a disclosed method is carried out when the machine-readable program code is executed by the control unit. The adaptation of the brake boosting can be limited by an exemplary electromechanical braking system in such a way that driving situations which are difficult to control for the driver are avoided in an operationally reliable manner. In this case, the effect of errors in the application can also be limited, so that even in the case of application errors in the characteristic curve of the brake boosting, a reliable control of the transportation vehicle is always ensured.

In at least one disclosed embodiment of the electromechanical braking system, it is provided that the electromechanical brake booster comprises an actuator motor, a reduction gear operationally connected to the actuator motor, and a pedal force sensor. The exerted pedal force can be matched with the applied boosting force by a reduction gear and a pedal force sensor, whereby the adaptation of the boosting force is facilitated.

In a further disclosed embodiment, it is provided that the control unit is connected via a signal line to the actuator motor of the electromechanical brake booster, wherein a change in the energizing of the actuator motor is limited to limit the change of the boosting force. By limiting the change of the energizing of the actuator motor, jumps in the characteristic curve can be limited in a simple manner, so that a sudden strong rise or fall in the boosting force is suppressed.

The various disclosed embodiments in this application are combinable with one another, if not stated otherwise in the specific case.

FIG. 1 shows an electromechanical braking system 10 for a transportation vehicle. The electromechanical braking system 10 comprises a brake pedal 50, an electromechanical brake booster 12, and a brake master cylinder 14. The brake master cylinder 14 is embodied as a tandem cylinder having a first pressure chamber 24 and a second pressure chamber 28, which are separated by a displaceable floating piston 20. The brake master cylinder 14 is connected to an ESP hydraulic unit 60, via which the wheel brakes of the individual transportation vehicle wheels can be activated.

The brake master cylinder 14 is connected via two brake circuits 16, 18 to the hydraulic unit 60. The two brake circuits 16, 18 are activated via a first floating piston 20 supported by a first restoring spring 26 and by a second pressure piston 30 supported by a further restoring spring 54. In this case, the two brake circuits 16, 18 each act on two wheel brakes of the transportation vehicle arranged diagonally in relation to one another, to enable a controllable stop of the transportation vehicle in the event of a failure of one brake circuit 16, 18. The first restoring spring 26 is used to press back the floating piston 20 so that brake fluid can flow in from a pressure reservoir 22 into the first pressure chamber 24 of the brake master cylinder 14. In the event of a leak in the second hydraulic brake circuit 18, the further restoring spring 54 is used to separate the floating piston 20 from the pressure piston 30, so that brake fluid can flow out of the pressure reservoir 22 into the second pressure chamber 28 between the floating piston 20 and the pressure piston 30. The restoring springs 26, 54 are designed so that they can fulfill this reset of both pistons 20, 30 in all operating situations of the electromechanical braking system 10.

The electromechanical brake booster 12 comprises a pushrod 32, which connects the brake pedal 50 to the brake master cylinder 14. This connection may be embodied in such a way that both pressure forces and also traction forces can be transmitted between the brake master cylinder 14 and the brake pedal 50. In this case, the pushrod 32 is operationally connected to the pressure piston 30 of the brake master cylinder 14 to enable a hydraulic pressure buildup in the two brake circuits 16, 18. The electromechanical brake booster 12 furthermore comprises an actuator motor 34, which is coupled to the pushrod 32. The actuator motor 34 can be embodied as a brushless electric gear motor. The actuator motor 34 comprises a stator 36 and a rotor 38, which are arranged concentrically around the pushrod 32. A spindle drive of the actuator motor 34, also arranged coaxially to the pushrod 32, comprises a spindle screw 40 which is mounted so it is rotationally fixed but is axially movable, and which is permanently connected to the pushrod 32. The spindle screw 40 meshes via balls with a ball screw nut 42, which is driven via the rotor 38 of the actuator motor 34.

In the event of an activation of the actuator motor 34, the ball screw nut 42 is set into rotation to generate a positive or negative force in the axial direction of the pushrod 32 depending on the rotational direction on the spindle screw 40 and thus on the pushrod 32. A positive force is understood as a force which is oriented in the same direction as a pedal force FP exerted by the driver upon actuation of the brake pedal 50. A negative force is to be understood as a force which counteracts the pedal force FP of the driver and thus reduces the pedal force FP exerted on the brake pedal 50.

In a boosting mode, the pushrod 32 is displaced in the direction of the brake master cylinder 14 as a result of the pedal force FP and also a positive boosting force FS provided by the actuator motor 34. In this case, the pedal force FP applied by the driver is detected by a pedal force sensor 44 on the pushrod 32. Alternatively or additionally, the pressure generated by the brake master cylinder 14 can also be detected by a pressure sensor 52 for this purpose. The stator 36 of the actuator motor 34 is energized based on the detected force. The rotor 38 of the actuator motor 34 thus begins to rotate. The spindle screw 40 and the pushrod 32 move translationally in the direction of the brake master cylinder 14 via the ball screw nut 42, which is connected in a rotationally-fixed manner to the rotor 38 or is embodied in one piece with the rotor 38, and the balls of the ball screw drive. The spindle screw 40 is mounted for this purpose so it is rotationally fixed but is free in the translational movement.

If the electromechanical brake booster 12 should fail, the driver can thus actuate the braking system 10 without boosting force FS using his pedal force exerted on the brake pedal 50. To reduce the brake pressure to zero after a brake actuation, the drive of the electromechanical brake booster 12 can be designed as self-inhibiting free. It can be designed so that a sufficient restoring force, which returns the electromechanical brake booster 12 and the brake pedal 50 into the respective starting positions thereof, is built up by the hydraulic counter pressure, the spring system 26, 54 of the brake master cylinder 14, and a possibly provided pedal restoring spring 46 in the electromechanical brake booster 12.

The electromechanical braking system 10 furthermore comprises a control unit 48, which is connected via signal lines 56 to the actuator motor 34 and also the pressure sensor 52 and the pedal force sensor 44. The control unit 48 comprises a memory, in which a program code 58 for carrying out a disclosed method for controlling the electromechanical braking system 10 is stored.

Figure 2:
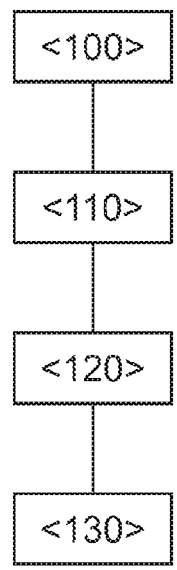
FIG. 2 shows a flow chart for carrying out a disclosed method for controlling an electromechanical braking system.

A flow chart for carrying out a disclosed method for controlling an electromechanical braking system 10 is illustrated in FIG. 2. In a first method operation <100>, the pedal force FP of the driver on the brake pedal 50 is detected. In a second method operation <110>, this pedal force FP is increased or decreased by the electromechanical brake booster 12, wherein in a method operation <120>, a change of the gradient in the brake boosting is ascertained and is compared to a threshold value FT for the gradient, wherein if the threshold value FT is exceeded, in a method operation <130>, a change of the boosting force FS by the electromechanical brake booster 12 is limited.

Figure 3:
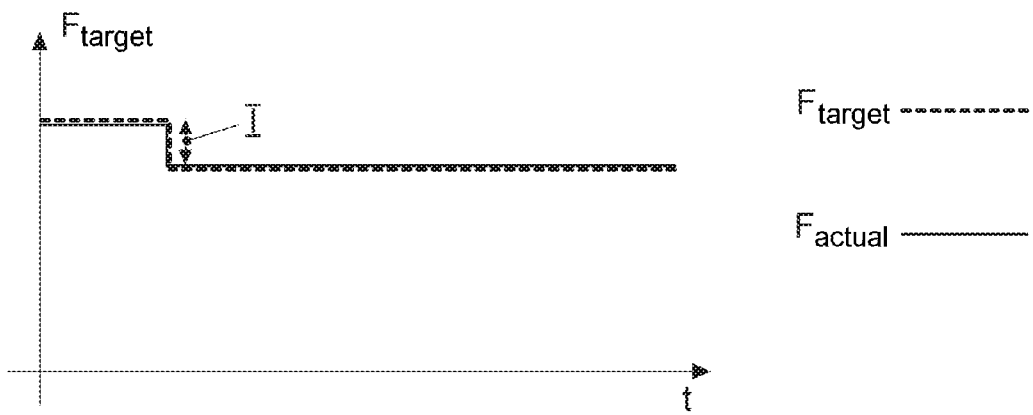
FIG. 3 shows the curve of the target variable for the brake boosting over time in the case of a small jump in the characteristic curve.

In FIG. 3, the time curve of the target variable Ftarget (dashed line) for the brake boosting and the output variable Factual (solid line) resulting therefrom for the brake boosting are shown. In this case, as shown in FIG. 3, no adaptation is performed in the event of a small jump I in the target characteristic curve, the target variable Ftarget is relayed unfiltered as the output variable Factual.

Figure 4:
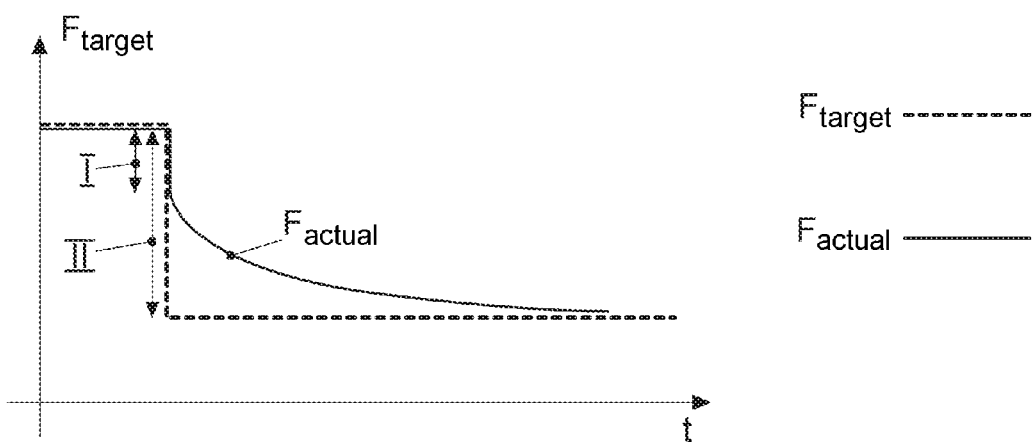
FIG. 4 shows the curve of the target variable for the brake boosting over time in the case of a large jump in the characteristic curve.

In FIG. 4, the time curve of the target variable Ftarget for the brake boosting is shown in the case of a large jump II in the characteristic curve for the target brake boosting. In this case, the target variable Ftarget is filtered accordingly by the gradient limitation and an acritical output variable Factual is output for the change of the brake boosting, which is classified as controllable for a driver of a transportation vehicle.

Figure 5:
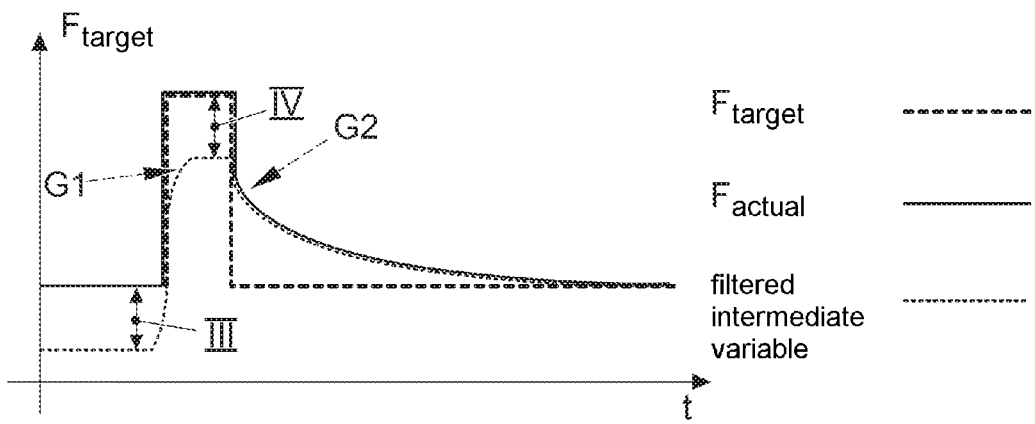
FIG. 5 shows the curve of the target variable for the brake boosting over time in the case of multiple successive jumps in the characteristic curve.

In FIG. 5, a characteristic curve for the target variable Ftarget of the brake boosting having multiple jumps III, IV is shown. In this case, the loss of brake boosting controllable by the driver is limited by two filter constants G1 and G2, whereby the changes in the output variable Factual are significantly less than the changes in the target variable Ftarget and are thus significantly easier to control for a driver of a transportation vehicle.

List of Reference Signs

10 electromechanical braking system
12 electromechanical brake booster
14 brake master cylinder
16 first brake circuit
18 second brake circuit
20 floating piston
22 pressure reservoir
24 first pressure chamber
26 restoring spring
28 second pressure chamber
30 piston
32 pushrod
34 actuator motor
36 stator
38 rotor
40 spindle screw
42 ball screw nut
44 pedal force sensor
46 restoring spring
48 control unit
50 brake pedal
52 pressure sensor
54 restoring spring
56 signal line
58 program code
60 ESP hydraulic unit $F_S$ boosting force
$F_{target}$ target variable for the brake boosting
$F_{actual}$ actual variable for the brake boosting
$F_T$ threshold value for the target brake boosting
$F_{T2}$ second threshold value for the target brake boosting
$F_P$ pedal force
G smoothing filter
G1 first filter constant of the smoothing filter
G2 second filter constant of the smoothing filter
I small jump
II large jump
III, IV multiple jumps
<100> first operation—detection of the pedal force $F_P$ of the driver on the brake pedal 50
<110> second operation—increase or decrease of the pedal force $F_P$ by the electromechanical brake booster 12
<120> third operation—ascertainment of a change of the gradient in the brake boosting and comparison to a threshold value $F_T$ for the gradient
<130> fourth operation—if the threshold value $F_T$ is exceeded, limiting a change of the boosting force $F_S$ by the electromechanical brake booster 12

The invention claimed is:

1. An electromechanical braking system comprising:
a brake pedal;
a brake master cylinder operationally connected to the brake pedal;
an electromechanical brake booster that includes an actuator motor, which increases a pedal force on the brake pedal; and
a control unit configured to ascertain a target variable for the brake boosting and an actual variable for the brake boosting, to determine a target gradient of a change of the target variable of the brake boosting, to compare the target gradient to a threshold value for the target gradient of the change of the target variable of the brake boosting, and to limit a boosting gradient of a change of a boosting force by the electromechanical brake booster in response to the threshold value for the target gradient being exceeded,
wherein the limiting of the boosting gradient of the change of the boosting force includes reducing the energization of the actuator motor such that the boosting gradient is less than the threshold value for the target gradient of the change of the target variable of the brake boosting.

2. The electromechanical braking system of claim 1, wherein the electromechanical brake booster includes a reduction gear operationally connected to the actuator motor and a pedal force sensor.

3. The electromechanical braking system of claim 1, wherein the control unit is connected via a signal line to the actuator motor of the electromechanical brake booster, wherein a change in the energizing of the actuator motor is limited to limit the change of the boosting force.

4. The electromechanical braking system of claim 1, wherein, in addition, an absolute change of the target variable for the brake boosting is ascertained, wherein the absolute change is compared to a further threshold value and in the event of an absolute change which is less than the further threshold value, no intervention is performed in the change of the boosting force by the electromechanical brake booster.

5. The electromechanical braking system of claim 4, wherein limiting of the change of the boosting force is performed in response to the absolute change of the target variable for the brake boosting being greater than the further threshold value.

6. The electromechanical braking system of claim 1, wherein a smoothing filter is used in response to a repeated change of the target variable for the brake boosting.

7. The electromechanical braking system of claim 6, wherein the smoothing filter comprises a first filter constant for increasing the brake boosting and a second filter constant for reducing the brake boosting.

8. The electromechanical braking system of claim 1, wherein a reduction of the boosting force of the electromechanical brake booster is limited.

9. The electromechanical braking system of claim 1, wherein an increase of the boosting force of the electromechanical brake booster is limited.

10. A method for controlling an electromechanical braking system having a brake pedal, a brake master cylinder operationally connected to the brake pedal, and an electromechanical brake booster, wherein the electromechanical brake booster comprises an actuator motor, which increases or decreases a pedal force on the brake pedal, the method comprising:
ascertaining a target variable for the brake boosting and an actual variable for the brake boosting;
determining a target gradient of a change of the target variable of the brake boosting;
comparing the target gradient to a threshold value for the target gradient of the change of the target variable of the brake boosting; and
limiting a boosting gradient of a change of the boosting force by the electromechanical brake booster in response to the threshold value for the target gradient being exceeded,
wherein the limiting of the boosting gradient of the change of the boosting force includes reducing the energization of the actuator motor such that the boosting gradient is less than the threshold value for the target gradient of the change of the target variable of the brake boosting.

11. The method of claim 10, wherein, in addition, an absolute change of the target variable for the brake boosting is ascertained, wherein the absolute change is compared to a further threshold value and in the event of an absolute change which is less than the further threshold value, no intervention is performed in the change of the boosting force by the electromechanical brake booster.

12. The method of claim 11, wherein limiting of the change of the boosting force is performed in response to the absolute change of the target variable for the brake boosting being greater than the further threshold value.

13. The method of claim 10, wherein a smoothing filter is used in response to a repeated change of the target variable for the brake boosting.

14. The method of claim 13, wherein the smoothing filter comprises a first filter constant for increasing the brake boosting and a second filter constant for reducing the brake boosting.

15. The method of claim 10, wherein a reduction of the boosting force of the electromechanical brake booster is limited.

16. The method of claim 10, wherein an increase of the boosting force of the electromechanical brake booster is limited.

17. A non-transitory computer readable medium including computer program code, which when implemented on a computer processor, performs a method for controlling an electromechanical braking system having a brake pedal, a brake master cylinder operationally connected to the brake pedal, and an electromechanical brake booster, wherein the electromechanical brake booster comprises an actuator motor, which increases or decreases a pedal force on the brake pedal, the method comprising:

ascertaining a target variable for the brake boosting and an actual variable for the brake boosting;

determining a target gradient of a change of the target variable of the brake boosting;

comparing the target gradient to a threshold value for the target gradient of the change of the target variable of the brake boosting; and limiting a boosting gradient of a change of the boosting force by the electromechanical brake booster in response to the threshold value for the target gradient being exceeded, wherein the limiting of the boosting gradient of the change of the boosting force includes reducing the energization of the actuator motor such that the boosting gradient is less than the threshold value for the target gradient of the change of the target variable of the brake boosting.

18. The non-transitory computer readable medium of claim 17, wherein, in the method, in addition an absolute change of the target variable for the brake boosting is ascertained, wherein the absolute change is compared to a further threshold value and in the event of an absolute change which is less than the further threshold value, no intervention is performed in the change of the boosting force by the electromechanical brake booster.

19. The non-transitory computer readable medium of claim 18, wherein, in the method, limiting of the change of the boosting force is performed in response to the absolute change of the target variable for the brake boosting being greater than the further threshold value.

20. The non-transitory computer readable medium of claim 18, wherein, in the method, a smoothing filter is used in response to a repeated change of the target variable for the brake boosting.

21. The non-transitory computer readable medium of claim 20, wherein, in the method, the smoothing filter comprises a first filter constant for increasing the brake boosting and a second filter constant for reducing the brake boosting.

22. The non-transitory computer readable medium of claim 18, wherein, in the method, a reduction of the boosting force of the electromechanical brake booster is limited.

23. The non-transitory computer readable medium of claim 18, wherein, in the method, an increase of the boosting force of the electromechanical brake booster is limited.

* * * * *